(12) United States Patent
Plee et al.

(10) Patent No.: US 7,532,454 B2
(45) Date of Patent: May 12, 2009

(54) METHOD FOR MAKING AN ELECTRODE, RESULTING ELECTRODE AND SUPERCAPACITOR INCLUDING SAME

(75) Inventors: Dominique Plee, Lons (FR); Pierre-Louis Taberna, Roques sur Garonne (FR)

(73) Assignee: Arkema France, Colombes (FR)

( * ) Notice: Subject to any disclaimer, the term of this patent is extended or adjusted under 35 U.S.C. 154(b) by 226 days.

(21) Appl. No.: 10/590,298

(22) PCT Filed: Mar. 4, 2005

(86) PCT No.: PCT/FR2005/000525

§ 371 (c)(1),
(2), (4) Date: Aug. 23, 2006

(87) PCT Pub. No.: WO2005/088657

PCT Pub. Date: Sep. 22, 2005

(65) Prior Publication Data

US 2007/0201184 A1    Aug. 30, 2007

(30) Foreign Application Priority Data

Mar. 9, 2004  (FR) .................................. 04 02437

(51) Int. Cl.
*H01G 9/00*    (2006.01)

(52) U.S. Cl. ..................... 361/502; 361/503; 361/504; 361/508; 361/512; 361/523

(58) Field of Classification Search ................. 361/502, 361/503–504, 508–512, 516–519, 523–525, 361/528–530
See application file for complete search history.

(56) References Cited

U.S. PATENT DOCUMENTS

| | | | | |
|---|---|---|---|---|
| 5,358,801 A * | 10/1994 | Brodd | .......................... | 429/215 |
| 6,118,650 A * | 9/2000 | Maeda et al. | ................ | 361/508 |
| 6,414,836 B1 * | 7/2002 | Tennent et al. | .............. | 361/313 |
| 6,547,990 B2 * | 4/2003 | Shinozaki et al. | ........... | 252/502 |
| 6,733,925 B2 * | 5/2004 | Hironaka et al. | ........ | 429/231.95 |
| 6,882,517 B2 * | 4/2005 | Tano et al. | ................... | 361/502 |
| 7,061,749 B2 * | 6/2006 | Liu et al. | ..................... | 361/502 |
| 7,088,572 B2 * | 8/2006 | Yoshida et al. | .............. | 361/504 |
| 2005/0014643 A1 | 1/2005 | Lini et al. | | |

FOREIGN PATENT DOCUMENTS

| | | |
|---|---|---|
| CA | CN1388540 | 1/2003 |
| JP | 2000124079 | 4/2000 |

* cited by examiner

*Primary Examiner*—Nguyen T Ha
(74) *Attorney, Agent, or Firm*—Steven D. Boyd

(57) ABSTRACT

The invention relates to a novel method for preparing electrodes based on activated carbon and carbon nanotubes on a collector. The invention also relates to the electrode obtained thereby and the supercapacitor comprising same.

12 Claims, No Drawings

METHOD FOR MAKING AN ELECTRODE, RESULTING ELECTRODE AND SUPERCAPACITOR INCLUDING SAME

FIELD OF THE INVENTION

The invention relates to a method for preparing a component material of electrodes intended particularly for electrochemical double layer energy storage cells (supercapacitors). The invention also relates to the electrodes obtained thereby and the supercapacitors comprising same.

BACKGROUND OF THE INVENTION

Storage cells called "supercapacitors" or Electric Double Layer Capacitors (EDLC) consist of current collectors on which an active material comprising carbon materials is applied. This system is then immersed in a solvent containing a salt and is used to store electrical energy for subsequent use.

Carbon materials largely consist of coal. A novel technique has been developed in recent years, comprising the combination of coal with carbon nanotubes (CNT), optionally in combination with metal oxides (CN1388540). The document by Liu et al., Chinese Journal of Power Sources, Vol. 26, No. 1, 36, Feb. 2002 describes the capacitive properties of a composite carbon nanotube/activated carbon electrode. This document states that the CNT/carbon blends give rise to a higher capacitance and better self-discharge properties. There is no particular description of the electrode fabrication method.

However, no document describes a fabrication method, particularly industrially applicable, which addresses the problem of electrode aging and which is nevertheless one of the most crucial from the application standpoint, because the supercapacitor is presumed to have a certain service life.

DETAILED DESCRIPTION OF THE INVENTION

The invention therefore proposes a method for fabricating electrodes based on a blend of activated carbon (AC) and carbon nanotubes (CNT) which have good aging properties.

The invention therefore provides a method for preparing electrodes based on activated carbon and carbon nanotubes on a collector, comprising the following steps: (a) blending of an initial powdery carbon material and a solvent; (b) addition of a polymer binder and blending until homogenized; (c) drying of the paste; (d) optionally, mixing of the paste; and (e) covering of the collector.

According to one embodiment, step a) is carried out by ultrasonication.

According to one embodiment, step a) is carried out at a temperature of at least 50° C.

According to one embodiment, the initial powdery carbon material of step a) is obtained by a method comprising the following steps: (f) dispersion of the carbon nanotubes in a solvent, preferably water; (g) addition of the activated carbon and blending; and (h) drying of the initial powdery carbon material.

According to a variant of this embodiment, the addition of activated carbon is followed by ultrasonication.

According to one embodiment, the initial powdery carbon material is a blend of activated carbon and carbon nanotubes, in a weight proportion ranging from 95/5 to 50/50.

According to one embodiment, the binder is an aqueous suspension of PTFE or styrene/butadiene.

According to one embodiment, step d) is carried out to fibrillation of the binder.

The invention also provides a method for preparing a paste based on activated carbon and carbon nanotubes, comprising steps a) to d) of the method according to the invention.

The invention further provides an improved-aging electrode obtained by the method according to the invention and a supercapacitor comprising at least one such electrode.

The invention is now described in greater detail in the description that follows.

The invention is based on a particular preparation method.

The carbon raw material (AC/CNT) in suspension in the solvent (at a temperature above 50° C., for example between 50° C. and 80° C.) is blended, particularly with ultrasound, for a period, for example, of between 5 and 60 minutes.

The binder (particularly those in aqueous suspension) is added until the blend is homogenized.

The blend is dried to evaporate the solvent.

Optionally, the paste is mixed to obtain the fibrillation of the PTFE if used as a binder.

The collectors are then covered.

According to one advantageous variant, the carbon raw material is prepared as follows:

The CNTs are dispersed in water for 1 to 30 minutes, for example using an Ultra-Turrax type device. The AC is then added with mechanical stirring. Ultrasonication is carried out for 1 to 30 minutes, followed by filtration and drying.

The method according to the invention, and its variant, also have a beneficial effect on the density of the electrode, its processability and/or its mechanical strength.

The invention further relates to the electrodes fabricated by the method described, which have improved aging.

These electrodes are useful for the fabrication of electrochemical double layer energy storage cells (EDLC supercapacitor).

In addition to aging, the invention serves to increase the conductivity and/or capacitance as a function of the current density. A further advantage of the invention is that the energy storage cells offer a good compromise between energy density and power density, display improved behavior with respect to internal resistance and/or capacitance maintained for high current densities.

The activated carbon used is any type of carbon conventionally used. Mention can be made of carbons produced from lignocellulose materials (pine, coconut, etc.). As activated carbons, mention can be made of those described in the application in the name of the applicant WO-A-0243088. Any other type of activated carbon is effective. The activated carbon may be obtained by chemical activation or preferably by thermal or physical activation. The activated carbon is preferably ground to a size, expressed in $d_{50}$, that is smaller than about 30 microns and preferably to a $d_{50}$ of about 10 microns. The ash content of the carbons is preferably lower than 10%, advantageously lower than 5%. These activated carbons are available on the market or can be prepared by known methods.

Carbon nanotubes (CNTs) are also known and generally consist of graphite foils rolled up as one or more sheets (Single-Walled Nanotube SWNT or Multi-Walled Nanotube MWNT). These CNTs are available on the market or can be prepared by known methods.

Other components and third substances can be used. Mention can be made in particular of nanotubes covered with conductive polymer to improve their energy holding behavior or nanotubes doped with a metal oxide. According to a preferred embodiment, the carbon material of the electrode consists of activated carbon and CNTs.

Materials suitable as polymer binders are, for example, thermoplastic polymers or elastomers or blends thereof that are soluble in said solvent. Among these polymers, mention may be made in particular of polyethers, such as polyoxyethylene (POE), polyoxypropylene (POP) and/or polyalcohols such as polyvinyl alcohol (PVA), ethylene/vinyl acetate copolymers (EVA), polytetrafluoroethylene (PTFE) and styrene/butadiene. Binders in aqueous suspension are advantageously used.

Preferably, the carbon/CNT blend is blended with the polymer in a weight ratio of 99/1 to 70/30, preferably of 98/2 to 90/10.

The solvent may be any aqueous or organic solvent such as acetonitrile or ethanol.

An EDLC-type supercapacitor is composed of: (1) a pair of electrodes of which at least one (and preferably both) is a carbon paste electrode according to the invention; (2) a porous ion conducting separator containing an electrolyte; and (3) a collector impermeable to ions and providing the electrical contact with the electrodes.

Electrode fabrication (1) begins with the paste or slurry obtained as above which is applied to a support, and the solvent is then evaporated to form a film. The paste obtained is then applied to a support, particularly by coating. It is advantageous for the coating to be made on a peelable support, for example using a template, of generally planar shape.

The solvent is then evaporated, for example under a hood. A film is obtained, the thickness of which depends particularly on the concentration of the carbon paste and the deposition parameters, but is generally between a few microns and one millimeter. For example, the thickness is between 100 and 500 microns.

The electrolytes suitable for use to produce EDLC capacitors consist of any highly ion conducting medium such as an aqueous solution of an acid, a salt, or a base. If necessary, nonaqueous electrolytes can also be used, such as tetraethylammonium tetrafluoroborate ($Et_4NBF_4$) in acetonitrile or gamma-butyrolactone or propylene carbonate.

One of the electrodes may consist of another material known in the art.

A separator (2) is inserted between the electrodes, generally of a highly porous material, of which the functions are to provide electronic insulation between the electrodes (1) while allowing the electrolyte ions to pass through. In general, any conventional separator can be used in an EDLC supercapacitor with high power and energy density. The separator (2) may be a membrane permeable to ions which permits the ions to pass through, but prevents the electrons from passing through.

The current collector (3) impermeable to ions may be any electrically conductive material which does not conduct ions. Satisfactory materials to be used for producing these collectors comprise: carbon, metals in general such as aluminum, conductive polymers, nonconductive polymers filled with conductive material to make the polymer electrically conductive, and similar materials. The collector (3) is electrically connected to an electrode (1).

The fabrication method and the energy storage cell according to the invention are described in greater detail in the following examples. These examples are provided for illustration and are nonlimiting for the invention.

EXAMPLE

In the examples, the electrodes are fabricated as follows:
blending with ultrasound of 95% of a dried carbon material, placed in suspension in ethanol at 70° C. for 15 minutes, then addition of 5% PTFE from a 60 wt % aqueous suspension, evaporation and mixing of the paste in the presence of ethanol until complete fibrillation of the PTFE, drying of the paste at 100° C., covering of the aluminum collectors, of variable thickness (initially 150 microns), by the paste to form the electrode. The collectors contain 99.9% aluminum and the total thickness, after lamination, is 450 microns.

The cells are assembled in a glove box in a controlled water and oxygen atmosphere of which the contents are lower than 1 ppm. Two 4 $cm^2$ area square electrodes are taken, between which a microporous polymer separator is inserted. The assembly is held in place with two PTFE wedges and two stainless steel clamps. The element is then placed in an electrochemical cell containing the electrolyte (mixture of acetonitrile and tetraethylammonium tetrafluoroborate).

In the examples, the electrochemical measurement protocol is as follows:

galvanostatic cycling: a constant current of + or −20 mA is imposed across the terminals of the capacitor and a charge-discharge curve is plotted: the voltage is monitored as a function of time between 0 to 2.3 V. The capacitance is determined from the capacitor discharge slope and the capacitance is expressed per electrode and per gram of active material by multiplying this value by two and then dividing it by the mass of active material. The resistance is measured by impedance spectroscopy. This test consists in subjecting the capacitor to a low amplitude sign wave voltage of variable frequency about an operating point (Vs=0; Is=0). The response current is out of phase with the excitation voltage; the complex impedance is accordingly the ratio of the voltage to the current, similar to a resistance. The resistance is expressed as the real part of the impedance, for a frequency of 1 kHz, multiplied by the electrode area;

aging tests performed as follows: a galvanostatic cycling at ±100 mA/$cm^2$ is carried out between 0 and 2.3 volts. The capacitance is directly determined from the supercapacitor discharge line, and the resistance is measured at each full-charge by a series of current pulses at 1 kHz. The measurements taken at each cycle serve to monitor the change in capacitance and resistance of the supercapacitor as a function of the number of charge/discharge cycles. The cycling is performed as many times as necessary to estimate the aging.

Example 1

Pure Carbon

The starting material is an active carbon grade 4S+ sold by CECA, obtained by physical treatment of maritime pine water vapor. The carbon tested had a particle size distribution (measured by laser scattering) with a $d_{50}$ of about 9 microns. This carbon was subjected to additional liquid phase treatment to lower the ash content. Its pH was about 7.5.

The BET specific surface areas and pore volumes, determined by the DTF (slit pore) method are given below:

surface area=1078 $m^2$/g micropore volume (<2 nm)=0.4 $cm^3$/g mesopore volume (2-50 nm)=0.55 $cm^3$/g macropore volume (>50 nm)=0.217 $cm^3$/g This carbon displayed the following performance in the tests presented:

| Capacitance (F/g) | | Resistance |
| --- | --- | --- |
| at 5 mA/cm² | at 100 mA/cm² | (ohm · cm² at 1 kHz) |
| 85 | 64 | 1 |

Example 2

Pure CNT

The nanotubes used were obtained from three sources:

CNT1. These nanotubes were prepared by a CVD ethylene decomposition process at 650-700° C. on an iron catalyst supported on alumina. These nanotubes are mainly multi-walled tubes with an outside diameter of about 10 to 30 nm. They were subjected to treatment in sulfuric acid medium to reduce their alumina and iron content, and the ash content, measured by TGA (Thermogravimetric Analysis), was about 2.5%. The composition of this nanotube, determined by chemical analysis, was: 0.02% $SiO_2$, 0.3% $Al_2O_3$, 1.9% $Fe_2O_3$, the remainder being carbon.

CNT2. These nanotubes were also fabricated by CVD. These nanotubes are mainly singled-walled or double-walled nanotubes with an outside diameter of about 5 to 10 nm. Their ash content, after acid treatment, was about 2% determined by TGA.

CNT3. These nanotubes were commercial products. They are multi-walled tubes with outside diameters with a wider size distribution, from 20 to 80 nm. Their ash content, determined by TGA, was 10.5%. The composition of the nanotube, determined by chemical analysis, was 6.4% $SiO_2$; 2.1% $Al_2O_3$; 2.5% $Fe_2O_3$ and 0.13% $TiO_2$, the remainder being carbon.

These CNTs displayed the following performance in the tests presented:

| | Capacitance at 5 mA/cm² (F/g) | Resistance at 1 kHz (ohm · cm²) |
| --- | --- | --- |
| CNT 1 | 40 | 0.4 |
| CNT 2 | 50 | 0.4 |

Example 3

Blends

The nanotube powder was blended with the activated carbon powder, previously dried, in a mortar to homogenize them, and were then suspended in ethanol at 70° C. with ultrasound. An aqueous suspension of PTFE was then added, and the solvent then evaporated and a paste recovered, which was worked in the presence of ethanol.

The performance was measured of 4S+/CNT mixtures containing 15% CNT with respect to the total mass of electrode. The results are given below:

| | Capacitance (F/g) | | Resistance at 1 kHz |
| --- | --- | --- | --- |
| | at 5 mA/cm² | at 100 mA/cm² | (ohm · cm²) |
| CNT 2 | 85 | 80 | 0.6 |
| CNT 1 | 80 | 70 | 0.7 |
| CNT 3 | 85 | — | 0.8 |

The results show that for blends with CNTs, the capacitance is decreased very little, if at all, and is better maintained as a function of the current density, while the resistance is nearly halved. The useful power is therefore increased.

Example 4

Blends

The performance was measured of 4S+/CNT mixtures containing 50% CNT with respect to the total mass of electrode. The results are given below:

| | Capacitance (F/g) | | Resistance at 1 kHz |
| --- | --- | --- | --- |
| | at 5 mA/cm² | at 100 mA/cm² | (ohm · cm²) |
| CNT 2 | 80 | 74 | 0.4 |
| CNT 1 | 70 | 60 | 0.5 |

The results show an improvement in resistance, with a slight drop in capacitance.

Example 5

In this example, the aging behavior of the electrodes prepared according to the invention was evaluated. The aging consisted of 10 000 galvanostatic cycles between 0 and 2.3 V at 100 mA/cm².

| | Capacitance at 5 mA/cm² (F/g) | | Resistance at 1 kHz (ohm · cm²) | |
| --- | --- | --- | --- | --- |
| | Initial | After aging | Initial | After aging |
| Pure carbon | 85 | 74 | 1 | 1.2 |
| CNT 1 (+15%) | 80 | 70 | 0.7 | 0.85 |
| CNT 2 (+15%) | 85 | 74 | 0.6 | 0.7 |

The addition of carbon nanotubes is found to decrease the resistance aging, making it possible to preserve the power of the system for longer.

Example 6

An activated carbon/CNT1 blend containing 5% CNT was tested. The blend was obtained by first dispersing the CNTs in water using an Ultra-Turrax stirrer at 15 000 rpm for 4 minutes, and then adding the carbon with gentle mechanical stirring. This was followed by ultrasonication for 5 minutes. The water was then removed by simple filtration at 80° C. The blend obtained was dried at 100° C. in an oven, and used to prepare the electrode by the method described in Example 3. The results are as follows:

|  Capacitance at 5 mA/cm² (F/g) || Resistance at 1 kHz (ohm · cm²) ||
| --- | --- | --- | --- |
| Initial | After aging | Initial | After aging |
| 83 | 68 | 0.8 | 0.92 |

The results show that a high shear dispersion process serves to use a smaller quantity of CNT.

Example 7

A microporous coconut-based carbon, ground to a $d_{50}$ of 10 microns, was tested. The BET surface area and pore volumes are given below:
surface area=1111 m²/g
micropore volume=0.45 cm³/g
mesopore volume=0.016 cm³/g
macropore volume=0.05 cm³/g The combined thickness of the collector and electrode was changed to increase it to 550 microns. The following results were obtained, with and without CNT1 at 15%, by comparison with a carbon blend containing 15% acetylene black (AB). The CNTs blended by the method of the invention are more effective than acetylene black at maintaining the capacitance and resistance during aging.

|  | Capacitance at 5 mA/cm² (F/g) || Resistance at 1 kHz (ohm · cm²) ||
| --- | --- | --- | --- | --- |
|  | Initial | After aging | Initial | After aging |
| Without CNT 1 | 92 | 75 | 0.8 | 1.2 |
| With CNT 1 | 85 | 80 | 0.6 | 0.64 |
| With AB | 83 | 74 | 0.7 | 0.8 |

Example 8

A chemical type carbon (BGX by CECA) was tested, ground to a $d_{50}$ close to 10 microns, and physically reactivated in an inert atmosphere at 800° C. The BET surface area and pore volumes are given below:
surface area=1566 m²/g
micropore volume=0.614 cm³/g
mesopore volume=0.64 cm³/g
macropore volume=0.401 cm³/g The combined thickness of the collector and electrode was changed to lower it to 450 microns. The following results were obtained, with and without 15% CNT2.

|  | Capacitance at 5 mA/cm² (F/g) || Resistance at 1 kHz (ohm · cm²) ||
| --- | --- | --- | --- | --- |
|  | Initial | After aging | Initial | After aging |
| Without CNT2 | 95 | 82 | 1 | 1.27 |
| With CNT2 | 92 | 81 | 0.6 | 0.71 |

The latter two examples demonstrate that the invention is reproducible with activated carbons and CNTs from various sources and of various types.

The invention claimed is:

1. A method for preparing electrodes based on activated carbon and carbon nanotubes on a collector, comprising the following steps:
    (a) blending, in a solvent an initial powdery carbon material comprising activated carbon and carbon nanotubes comprising graphite foils rolled up as one or more sheets to form an initial powdery carbon material in a weight proportion of activated carbon to carbon nanotubes of from 95/5 to 50/50;
    (b) adding polymer binder and blending until homogenized to form a paste;
    (c) drying of the paste;
    (d) optionally, mixing of the paste; and
    (e) covering of the collector with the paste.

2. The method as claimed in claim 1, in which step a) is carried out by ultrasonication.

3. The method as claimed in claim 1,in which step a) is carried out at a temperature of at least 50° C.

4. The method as claimed in claim 1, in which the initial powdery carbon material of step a) is obtained by a method comprising the following steps:
    (f) dispersion of the carbon nanotubes in a solvent;
    (g) addition of the activated carbon and blending; and
    (h) drying of the initial powdery carbon material.

5. The method as claimed in claim 4, in which the addition of activated carbon is followed by ultrasonication.

6. The method as claimed in claim 4 in which said solvent is water.

7. The method as claimed in claim 1, in which the binder is an aqueous suspension of polytetrafluoroethylene or styrene/butadiene.

8. The method as claimed in claim 1, in which step (e) is carried out to fibrillation of the binder.

9. A method for preparing a paste based on activated carbon and carbon nanotubes, comprising steps a) to d) as claimed in claim 1.

10. An improved-aging electrode obtained by the method as claimed in claim 1.

11. A supercapacitor comprising at least one electrode as claimed in claim 10.

12. A method for preparing electrodes based on activated carbon and carbon nanotubes on a collector, comprising the following steps:
    (a) blending, in a first solvent, an initial powdery carbon material comprising activated carbon and carbon nanotubes comprising graphite foils rolled up as one or more sheets to fonn an initial powdery carbon material in a weight proportion of activated carbon to carbon nanotubes of from 95/5 to 50/50;
    (b) adding polymer binder, in a second solvent, and blending until homogenized to form a paste;
    (c) drying of the paste to evaporate said first solvent;
    (d) optionally, mixing of the paste;
    (e) covering of the collector with the paste;
    (f) drying the paste to evaporate said second solvent to form a film on said collector.

* * * * *